US008537569B2

(12) United States Patent
Myers et al.

(10) Patent No.: US 8,537,569 B2
(45) Date of Patent: Sep. 17, 2013

(54) STORED ENERGY DISSIPATING CIRCUITS AND METHODS FOR SWITCHED MODE POWER SUPPLIES

(75) Inventors: Peter J. Myers, Dunedin, FL (US); Joseph Paul Chobol, Morrisville, NC (US)

(73) Assignee: Cree, Inc., Durham, NC (US)

( * ) Notice: Subject to any disclaimer, the term of this patent is extended or adjusted under 35 U.S.C. 154(b) by 308 days.

(21) Appl. No.: 12/824,842

(22) Filed: Jun. 28, 2010

(65) Prior Publication Data
US 2011/0235374 A1 Sep. 29, 2011

Related U.S. Application Data

(60) Provisional application No. 61/318,005, filed on Mar. 26, 2010.

(51) Int. Cl.
H02M 3/335 (2006.01)
H02H 7/10 (2006.01)
H02J 7/00 (2006.01)

(52) U.S. Cl.
USPC .............................. 363/17; 363/50; 320/166

(58) Field of Classification Search
USPC ...................... 320/166; 363/50, 17
See application file for complete search history.

(56) References Cited

U.S. PATENT DOCUMENTS

| 4,250,457 | A  | * | 2/1981 | Hofmann ..................... 329/349 |
| 6,359,794 | B1 |   | 3/2002 | Real |
| 7,466,569 | B2 | * | 12/2008 | Yang et al. ................. 363/21.03 |
| 7,652,898 | B2 | * | 1/2010 | Kim et al. ....................... 363/49 |
| 2007/0109820 | A1 | * | 5/2007 | Yang et al. ................. 363/21.03 |
| 2008/0048732 | A1 |   | 2/2008 | Oki |
| 2008/0101102 | A1 |   | 5/2008 | Lipcsei et al. |
| 2008/0265984 | A1 | * | 10/2008 | Bertin et al. .................. 327/540 |
| 2009/0175054 | A1 |   | 7/2009 | Appel et al. |

OTHER PUBLICATIONS

International Search Report and the Written Opinion of the International Searching Authority Corresponding to International Application No. PCT/US 11/29578; Date of Mailing: May 31, 2011; 9 Pages.
International Preliminary Report on Patentability for corresponding application No. PCT/US2011/029578 mailed Oct. 11, 2012.

* cited by examiner

*Primary Examiner* — M'Baye Diao
(74) *Attorney, Agent, or Firm* — Myers Bigel Sibley & Sajovec, P.A.

(57) ABSTRACT

A circuit includes a detector configured to detect a state of a power supply including an energy storage component and to generate a control signal responsive to the state of the power supply, a dissipating component, and a switch configured to controllably couple the dissipating component to the energy storage component in response to the control signal output by the detector. Methods of operating a power supply including an energy storage component and a dissipating component are disclosed. The methods include monitoring the power supply to determine if the power supply may be active, and, in response to determining that the power supply may be inactive, coupling the dissipating component to the energy storage component to dissipate energy from the energy storage component.

14 Claims, 5 Drawing Sheets

US 8,537,569 B2

STORED ENERGY DISSIPATING CIRCUITS AND METHODS FOR SWITCHED MODE POWER SUPPLIES

CROSS-REFERENCE TO PROVISIONAL APPLICATION

This application claims the benefit of, and priority from, Provisional Application Ser. No. 61/318,005, filed Mar. 26, 2010 entitled SWITCHED ENERGY DISSIPATING CIRCUITS AND METHODS OF SWITCHED MODE POWER SUPPLIES, the disclosure of which is hereby incorporated herein by reference in its entirety as if set forth fully herein.

FIELD OF THE INVENTION

The present invention relates to power conversion and, more particularly, to switched mode power supplies and related methods of operation.

BACKGROUND

Power converter circuits may be used to convey power from a source, such as a battery, electrical power grid, etc. to a load, such as any device, apparatus, or component that runs on electricity, preferably with as little loss as possible. Generally, a power converter circuit provides an output voltage that has a different level than the input voltage. One type of power converter circuit is known as a switching or switched mode power supply. A switched mode power supply controls the flow of power from a power source to a load by controlling the "on" and "off" duty cycle of one or more transistor switches in order to regulate the DC output voltage across the output terminals of the power supply. The "on" and "off" duty cycle of the one or more transistor switches may be controlled in response to a pulse-width-modulated (PWM) gate drive signal provided by a switching regulator circuit, such that the "on" and "off" duty cycle of the one or more transistor switches is determined by relative pulse-widths of the PWM signal.

Switched mode power supplies have been implemented as an efficient mechanism for providing a regulated output, and are generally more power efficient than linear voltage regulators, which dissipate unwanted power as heat.

Some switched mode power supplies may use a transformer or an inductor as an energy transfer element and a capacitor as an energy storage element. A power transistor may be coupled to one side of the primary winding of a transformer, and may be turned on and off in response to the gate drive signal provided by the switching regulator circuit to alternately store energy in the magnetic field of the transformer and transfer the stored energy to the secondary winding. The secondary winding of the transformer may develop a rectified output voltage across a shunt output capacitor, which is typically an electrolytic capacitor, coupled across the secondary winding as a function of the energy transfer. The voltage across the output capacitor may provide the DC output voltage of the switching power supply.

In order to properly restart a power supply circuit, such as a power supply circuit that is used as a driver circuit for light emitting diodes (LEDs), it may be desirable to cause the energy stored in the output capacitor to drain out before restarting the power supply circuit. This will reduce the voltage on the output capacitor to a voltage that is below a point at which the circuit may be restarted properly upon re-application of the input voltage generated by the primary controller.

A conventional method of causing the output capacitor to drain is to provide a load resistor across the output capacitor. The load resistor will drain the output capacitor when the primary controller is shut down. However, the resistor will also dissipate power while the circuit is active. Furthermore, the resistor will need to have a sufficiently low resistance in order to effectively reduce the output capacitor voltage when the circuit is shut off. As a result, the resistor may undesirably dissipate a substantial amount of power.

SUMMARY

This Summary is provided to introduce a selection of concepts in a simplified form, the concepts being further described below in the Detailed Description. This Summary is not intended to identify key features or essential features of this disclosure, nor is it intended to limit the scope of the disclosure.

A circuit according to some embodiments includes a detector configured to detect a state of a power supply including an energy storage component and to generate a control signal responsive to the state of the power supply, a dissipating component, and a switch configured to controllably couple the dissipating component to the energy storage component in response to the control signal output by the detector.

The detector may be configured to detect a signal at an output of a rectifier component of the power supply.

The detector may include an input node and an output node, a charging diode having an anode coupled to the input node and a cathode coupled to the output node, a storage capacitor having a terminal coupled to the output node, and a discharge resistor having a terminal coupled to the output node.

The circuit may further include a second diode having a cathode coupled to the input node and an anode coupled to a second terminal of the storage capacitor and a second terminal of the discharge resistor.

The detector may include a DC blocking capacitor configured to receive an internal signal of the power supply. The detector may include an envelope detector coupled to the DC blocking capacitor.

The detector may further include a current limiting resistor between the DC blocking capacitor and the envelope detector.

The detector may further include a voltage limiting device coupled to an output of the envelope detector.

The switch may include an inverter including an input configured to receive an output from the detector and an output coupled to the dissipating component.

The inverter may include a first transistor including a control terminal and an output terminal. The input may be coupled to the control terminal of the first transistor. A first resistor may be coupled between a first supply voltage and the output terminal of the first transistor, a second resistor may be coupled between the output terminal of the first transistor and a ground terminal. The inverter may further include a second transistor including a control terminal and an output terminal. The control terminal of the second transistor may be coupled to the output terminal of the first transistor.

The circuit may further include a load resistor, the output terminal of the second transistor may be coupled to the load resistor.

The switch may include a first switch, and the detector may be configured to detect a control signal of the power supply that controls a second switch coupled to the storage component in the power supply.

The switch may be configured to couple the dissipating component to the energy storage component in response to the control signal indicating that the power supply is not actively generating an output voltage. For example, the switch may be configured to couple the dissipating component to the energy storage component in response to the control signal indicating that the power supply is not actively storing energy in the energy storage component.

A power supply according to some embodiments includes a rectifier component, an energy storage component, a first switch coupled between the rectifier component and the energy storage component, and a power dissipating circuit. The power dissipating circuit includes a detector configured to detect a state of the power supply and to generate a control signal responsive to the state of the power supply, a dissipating component, and a second switch configured to controllably couple the dissipating component to the energy storage component in response to the control signal output by the detector.

A method of operating a power supply including an energy storage component and a dissipating component includes monitoring the power supply to determine if the power supply may be active, and, in response to determining that the power supply may be inactive, coupling the dissipating component to the energy storage component to dissipate energy from the energy storage component.

Monitoring the power supply may include detecting a signal of the power supply that may be indicative of a state of the power supply.

Detecting the signal of the power supply may include detecting a signal at an output of a rectifier in the power supply.

Detecting the signal at the output of the rectifier in the power supply may include detecting an envelope of the signal at the output of the rectifier in the power supply.

Detecting the signal of the power supply may include detecting a control signal applied to a switch in the power supply.

It will be understood that the present invention may be embodied as methods, circuits, and/or electronic devices, and that such embodiments will be or become apparent to one with skill in the art upon review of the following drawings and detailed description. It is intended that all such additional methods, circuits, and/or electronic devices, as well as any combinations of the above embodiments, be included within this description and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
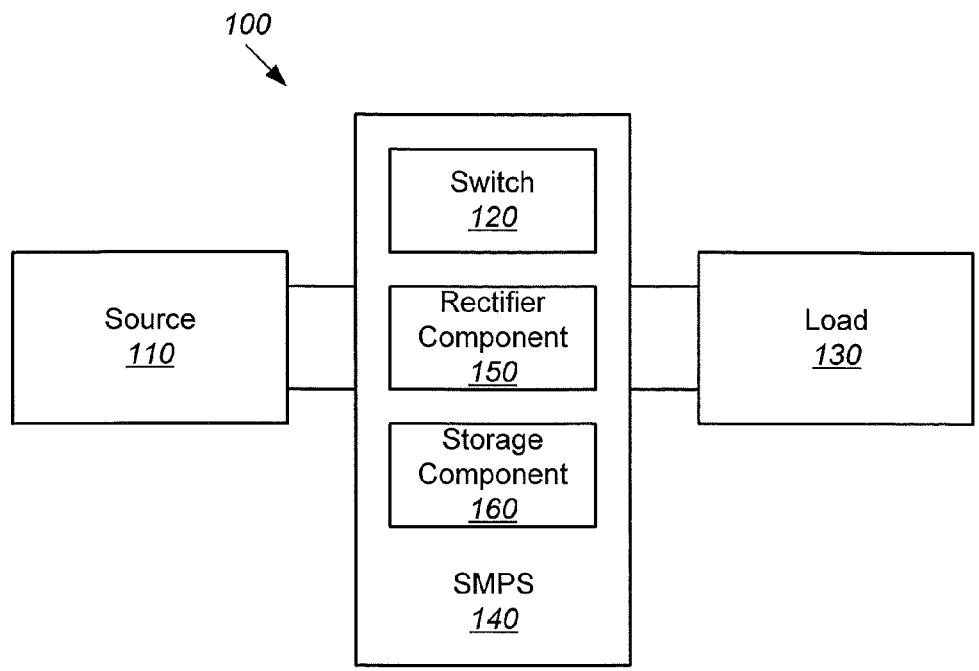
FIG. 1 is a schematic block diagram of a system according to some embodiments including a power source and a switched mode power supply coupled to a load.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide a circuit that is configured to monitor the status of a power supply having an energy storage component, such as, for example, a switched mode power supply, and to dissipate (drain) the energy from the energy storage component, such as an output capacitor, of the power supply in response to detecting that energy is not being supplied to the power supply. According to some embodiments, a dissipating component, such as a resistor, is switched across the storage component in response to the input power to the power supply being cut off, so that the power supply is not actively generating an output voltage. This may allow the use of a dissipating resistor having a lower resistance value to be used, since the higher power dissipation will be brief as the output capacitor discharges. Furthermore, excess power consumed by the power supply may not be affected significantly, as the dissipating resistor may not be active (i.e., switched across the output capacitor) while the power supply driver circuit is powered on. According to some embodiments, only the circuitry that is provided to monitor the status of the driver circuit may be active while the driver circuit is active, and such circuitry may require relatively little power to operate.

Referring now to FIG. 1, a system 100 according to some embodiments includes a power source 110 and a switched mode power supply 140 coupled to a load 130, which are connected as shown. The power source 110 may be an Alternating Current (AC) or a Direct Current (DC) power supply. As shown in FIG. 1, the switched mode power supply 140 includes a switch 120, a rectifier component 150, and a storage component 160, such as a capacitor. The load 130 may be any apparatus or device that receives the output voltage/current generated by the switched mode power supply 140 responsive to an input voltage/current received from the power source 110.

Figure 2:
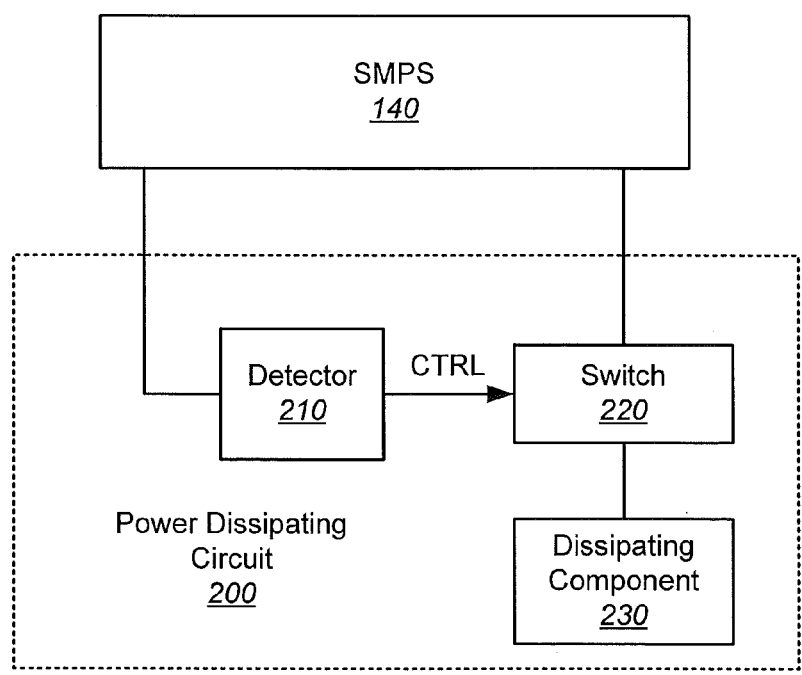
FIG. 2 is a schematic block diagram illustrating a power dissipating circuit according to some embodiments that is coupled to a switched mode power supply.

Referring to FIG. 2, a power dissipating circuit 200 according to some embodiments is coupled to a switched mode power supply 140 (or is provided as a component of an SMPS 140). The power dissipating circuit 200 includes detection means for detecting a state of the power supply 140, such as a detection circuit or detector 210, a dissipating component 230, and switch means, such as a switch 220, for controllably coupling the dissipating component to the energy storage component in response to the control signal output by the detector 210. The dissipating component 230 may include, for example, a resistor that is configured to dissipate energy in the form of heat. The detector 210 may monitor an internal signal of the SMPS 140 and determine, responsive to the internal signal of the SMPS 140, whether or not the SMPS 140 is active.

In some embodiments, the detector 210 may include an envelope detector that is configured to detect an envelope of a signal, such as a rectified output waveform that may be present in the SMPS 140. The detector 210 generates a control signal CTRL as an output in response to the detection of the signal within the SMPS 140. The control signal CTRL controls a switch 220 that responsively activates or deactivates the dissipating component 230 to selectively cause energy in the storage component 160 of the SMPS 140 to dissipate. In this manner, the dissipating component 230 may be coupled to the storage component 160 only when the SMPS 140 is not actively generating an output voltage.

In some embodiments, the detector 210 may be configured to detect switching peaks or an envelope at the output of the rectifier component 150, such as a rectifying diode used in the output stage of the SMPS 140. A rectifying diode used in the output of a switch-mode power supply generally rectifies a high frequency signal, typically in the range of a few tens of kHz to over 1 MHz. Detecting the envelope of a signal across a rectifying diode may have certain advantages. For example, the method can be used on either an isolated or non-isolated supply, detection can be performed using lower voltage signals, which may simplify the design, and/or the response can be relatively rapid depending on the implementation of the detection.

Figure 3:
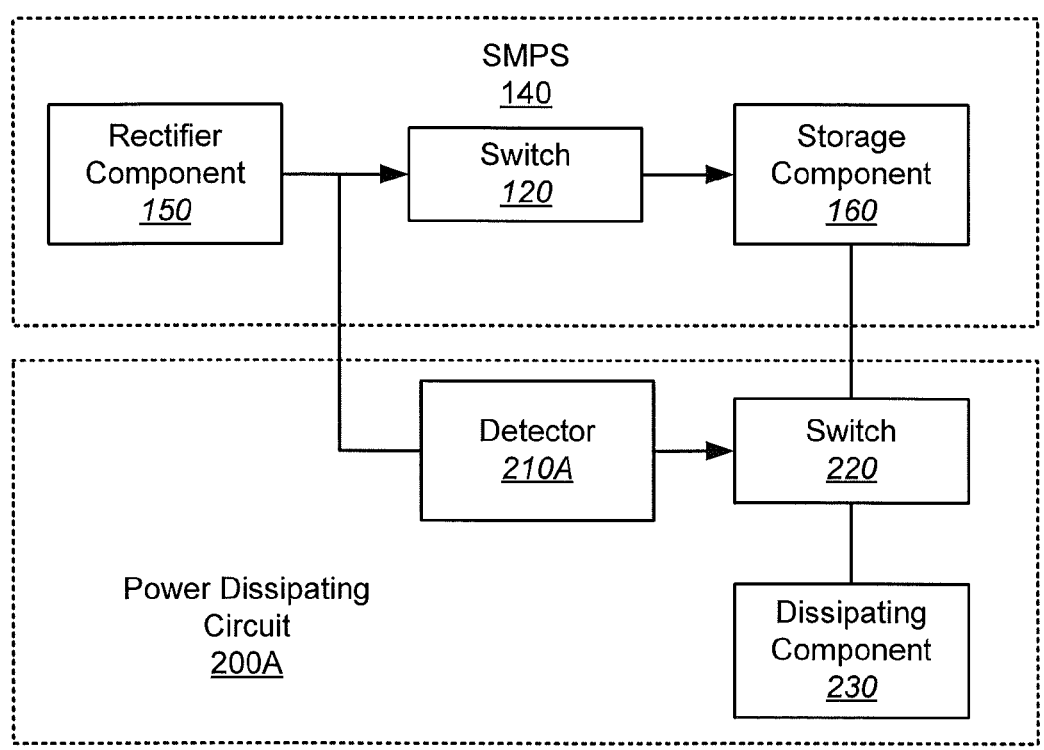
FIG. 3 is a schematic block diagram illustrating a power dissipating circuit according to some embodiments that is coupled to a switched mode power supply.

FIG. 3 illustrates a power dissipating circuit 200A including a detector 210A according to some embodiments. As shown therein, the detector 210A is coupled to an output of the rectifier component 150 of the SMPS 140.

Figure 4:
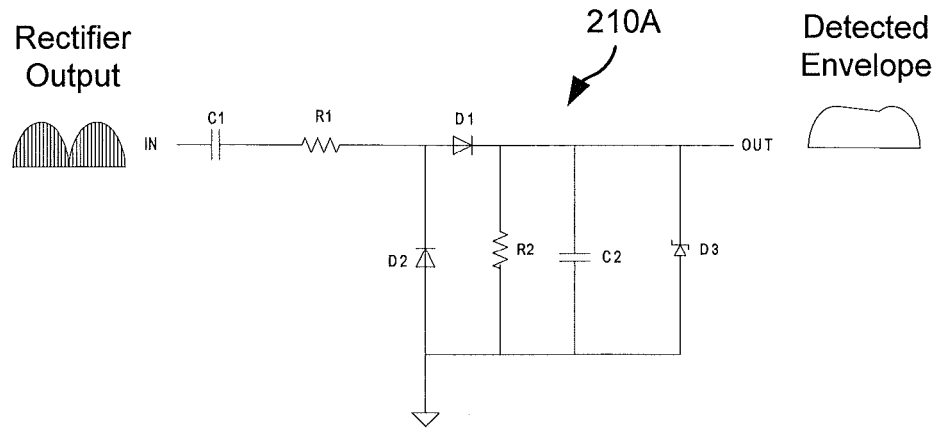
FIG. 4 is a schematic circuit diagram that illustrates a detector according to some embodiments.

FIG. 4 is a circuit diagram illustrating in greater detail a detector 210A that is configured to detect an output of a rectifier component. Referring to FIG. 4, a detector 210A according to some embodiments includes an input terminal IN, capacitors C1 and C2, resistors R1 and R2, diodes D1, D2 and D3, and an output terminal OUT.

Capacitor C1 is an optional DC blocking capacitor. If the input signal becomes non-zero and time-invariant (i.e., becomes DC), the output of the detector 210A approaches zero. This may prevent a DC level on the input from appearing at the output of the detector 210A. Some applications may require or desire this property.

R1 is an optional current limiting resistor. If signals with high dv/dt (i.e. a high rate of change of voltage) are applied to C1, large peak currents can result. It may be desirable to suppress such high currents.

D1 is provided as a peak charging rectifier. If at any instant in time the anode of D1 is at a higher voltage than the cathode by an amount sufficient to overcome the built-in voltage forward voltage drop of D1, current will flow into storage capacitor C2, increasing the voltage on capacitor C2. When the voltage on the cathode of D1 is higher than the voltage on the anode of D1, D1 is non-conducting, and the voltage on the capacitor C2 cannot discharge through D1. This property charges C2 to the peak value of the input voltage minus the forward voltage drop of D1 and the voltage drop across R1 induced by current flow through R1. The diode D2 allows the charge to be reversed on the capacitor C1 as the voltage polarity across the capacitor C1 reverses.

The resistor R2 is provided as the discharge resistor for the storage capacitor C2. The resistor R2, in combination with the diode D1, makes the charge/discharge cycle of the capacitor C2 asymmetric. The R1-R2-C2 combination also has a time constant which can act as a low-pass filter, attenuating the high frequency input and preventing at least a portion of it from reaching the output. In this way, only the envelope of the high frequency output of the rectifier component 150 may be present at the output of the detector 210A. The absence of a switching signal due to cessation of the activity of the SMPS 140 will result in the output of the detector quickly decaying to zero volts, and is therefore an indicator of the state of the SMPS 140.

D3 is an optional clamping zener diode, and is used to limit the output voltage to a value determined by the zener voltage, Vz, of the zener diode D3.

Figure 5:
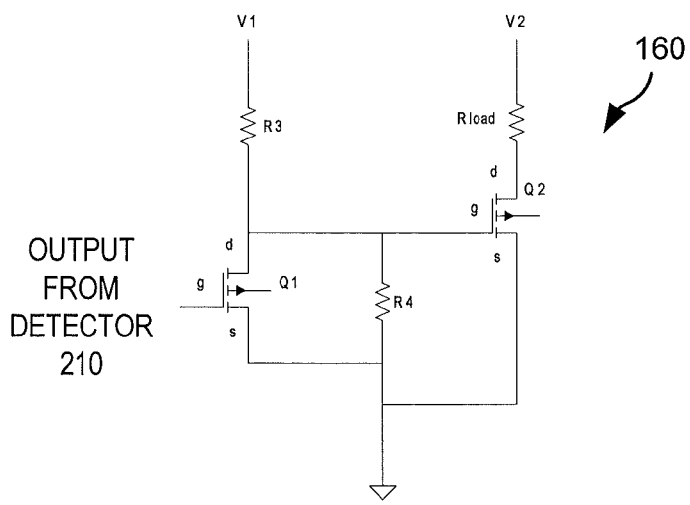
FIG. 5 is a schematic circuit diagram that illustrates a switching circuit in accordance with some embodiments.

FIG. 5 illustrates a switching circuit 220 that may be used in some embodiments. A switching circuit 220 according to some embodiments includes transistors Q1 and Q2 which are biased to operate as switches and are connected to form an inverter. The switching circuit 220 also includes resistors R3, R4 and Rload. Although the transistors Q1 and Q2 are illustrated as field effect transistors (FETs), it will be appreciated that other types of transistors or other electronic devices could be used.

The output from the detector 210 is applied to the gate of the first transistor Q1. The resistor R3 is a pull up resistor that is connected to the drain of the transistor Q1, and a supply voltage V1 is applied to the drain of the first transistor through the resistor R3.

The drain of the first transistor. Q1 is connected to the gate of the second transistor Q2 so that the output of the first transistor Q1 provides an input signal to the second transistor Q2.

The resistor Rload is the loading resistor (or dissipating resistor, corresponding to the dissipating component 230 of FIGS. 2-3) that is configured to drain the charge from the power supply storage component 160 when it is coupled thereto in response to the second transistor Q2 being placed in a conducting state.

The resistor R4 is an optional voltage divider resistor that is provided to bias the voltage on the drain of the first transistor Q1 and the gate of the second transistor Q2. It may be desirable to provide the resistor R4 in some circuit configurations to reduce the voltage at the gate of the second transistor Q2 to a non-destructive level.

V1 and V2 are the supply voltages that operate the load switches provided by the transistors Q1 and Q2. V1 and V2 may be the identical source, derived from a common source, or independent sources.

The output from the detector 210 is applied to the gate of the first transistor Q1. While the gate of Q1 is high, the drain of Q1 and the gate of Q2 are low. If the gate of Q2 is low, Q2 is in the off state, and current is not flowing through Rload. When the output of the detector 210 goes low, the first transistor Q1 turns off, and the second transistor Q2 turns on, causing current to flow through Rload, and dissipating the energy from the storage component 160 of the SMPS 140 (e.g., the output capacitor).

The switching circuit 220 can have numerous configurations, including inverting and non-inverting, and can be implemented using FETs, bipolar transistors (BJTs), thyristors, and/or other devices.

Figure 6:
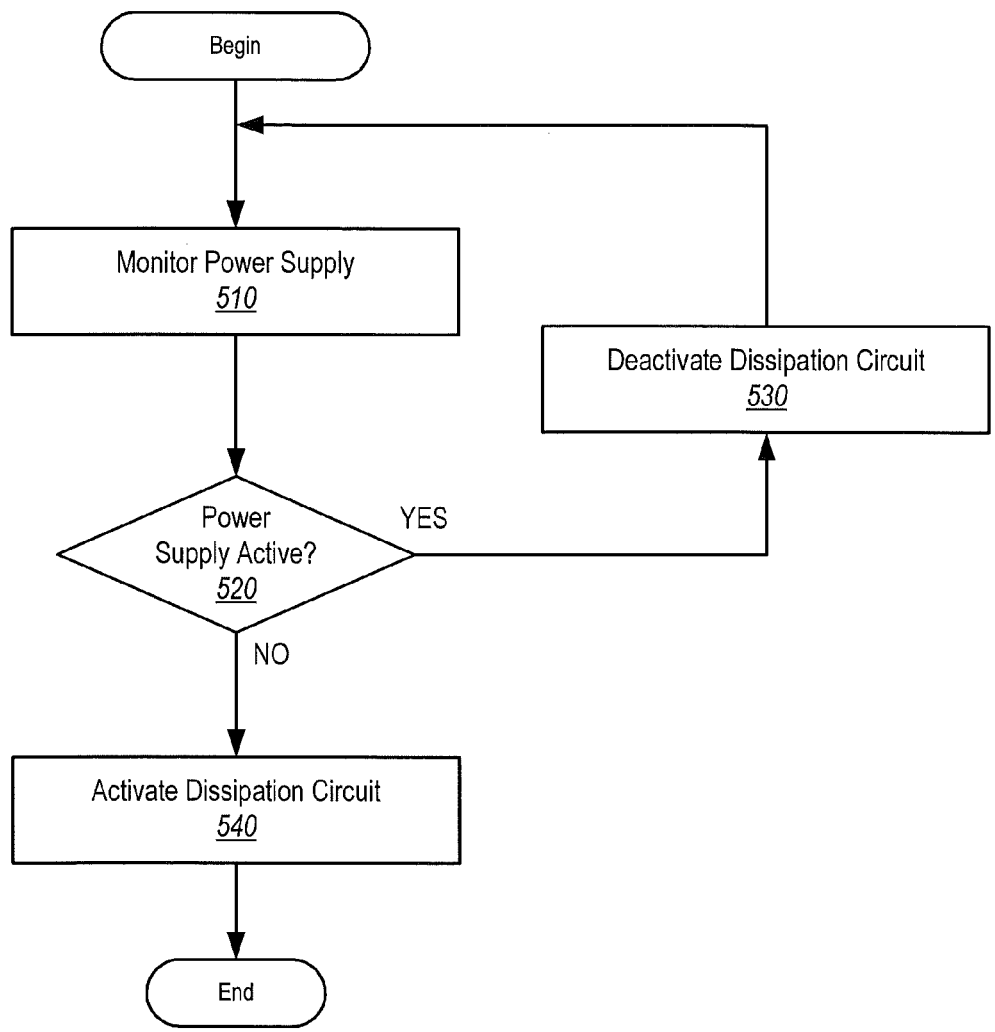
FIG. 6 is a flowchart illustrating operations of systems/methods according to some embodiments.

FIG. 6 illustrates methods according to some embodiments. As shown therein, a signal of a power supply is monitored (Block 510). In some embodiments, a voltage output from a rectifying element of the power supply is evaluated to determine whether or not the power supply is active (Block 520). If the power supply is determined to be active, a dissipation circuit that is configured to dissipate energy stored in a storage component 160 of the power supply is deactivated (Block 530). Conversely, if the power supply is determined not to be active in Block 520, the dissipation circuit is activated to dissipate energy stored in a storage component 160 (Block 540).

Figure 7:
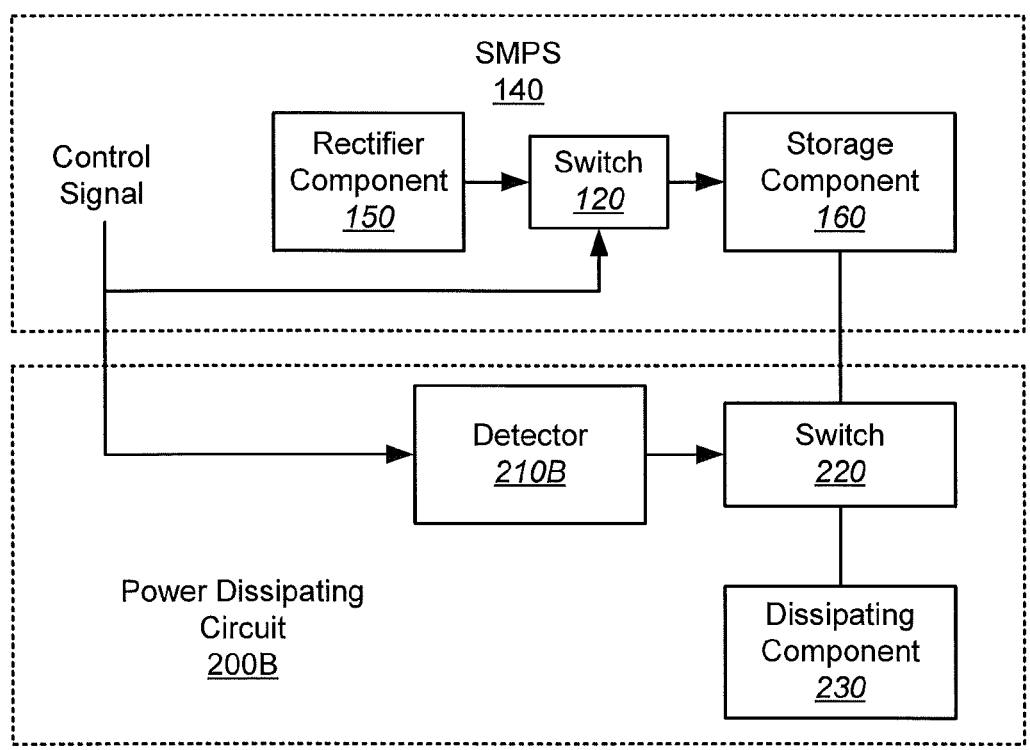
FIG. 7 is a schematic block diagram illustrating a power dissipating circuit according to further embodiments that is coupled to a switched mode power supply.

A power dissipating circuit 200B including a detector 210B according to further embodiments is illustrated in FIG. 7. As shown therein, the detector 210B may be configured to detect a control signal, such as a PWM gate driver signal, that is present in the power supply 140 and control the switch 220 in response to a state of the control signal. When the state of the control signal indicates that the power supply 140 is active, the detector 210B may control the switch 220 to deactivate the dissipating component 230. Conversely, when the state of the control signal indicates that the power supply 140 is inactive, the detector 210B may control the switch 220 to activate the dissipating component 230 to dissipate energy stored in the storage component 160 of the power supply 160.

In some embodiments, the detector 210B may be configured in a manner similar to the detector circuit 210A shown in FIG. 4, with appropriate selection of resistance and capacitance values taking into consideration the characteristics of the PWM gate drive signal that is being monitored.

Embodiments of the present invention may be used in power supplies for driving solid state light sources, such as light emitting diodes (LEDs) used in various applications, such as LED lighting systems for general illumination and/or LED backlighting for display technologies. However, embodiments of the present invention may be used in any power application having energy storage elements, for example, switched mode power applications, and are not limited specifically to those described herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A circuit, comprising:
   a detector configured to detect a state of a power supply including an output energy storage component that is configured to supply an output voltage to a load and to generate a control signal responsive to the state of the power supply;
   a dissipating component; and
   a switch configured to controllably couple the dissipating component to the output energy storage component in response to the control signal output by the detector;
   wherein the detector is configured to detect a signal at an output of a rectifier component of the power supply that couples energy to the output energy storage component; and
   wherein the detector comprises a DC blocking capacitor configured to receive an internal signal of the power supply.

2. The circuit of claim 1, wherein the detector comprises:
   an input node and an output node;
   a charging diode having an anode coupled to the input node and a cathode coupled to the output node;
   a storage capacitor having a terminal coupled to the output node; and
   a discharge resistor having a terminal coupled to the output node.

3. The circuit of claim 2, further comprising a second diode having a cathode coupled to the input node and an anode coupled to a second terminal of the storage capacitor and a second terminal of the discharge resistor.

4. The circuit of claim 1, wherein the detector comprises an envelope detector coupled to the DC blocking capacitor.

5. The circuit of claim 4, wherein the detector further comprises a current limiting resistor between the DC blocking capacitor and the envelope detector.

6. The circuit of claim 5, wherein the detector further comprises a voltage limiting device coupled to an output of the envelope detector.

7. The circuit of claim 1, wherein the switch comprises a first switch, and wherein the detector is configured to detect a control signal of the power supply that controls a second switch coupled to the storage component in the power supply.

8. The circuit of claim 1, wherein the switch is configured to couple the dissipating component to the energy storage component in response to the control signal indicating that the power supply is not actively generating an output voltage.

9. The circuit of claim 1, wherein the switch is configured to couple the dissipating component to the output energy storage component in response to the control signal indicating that the power supply is not actively charging the energy storage component.

10. A circuit, comprising:
    a detector configured to detect a state of a power supply including an output energy storage component that is configured to supply an output voltage to a load and to generate a control signal responsive to the state of the power supply;

a dissipating component; and a switch configured to controllably couple the dissipating component to the output energy storage component in response to the control signal output by the detector;

wherein the switch comprises an inverter including an input configured to receive an output from the detector and an output coupled to the dissipating component.

11. The circuit of claim 10, wherein the inverter comprises:

a first transistor including a control terminal and an output terminal, wherein the input is coupled to the control terminal of the first transistor;

a first resistor coupled between a first supply voltage and the output terminal of the first transistor;

a second resistor coupled between the output terminal of the first transistor and a ground terminal; and a second transistor including a control terminal and an output terminal, wherein the control terminal of the second transistor is coupled to the output terminal of the first transistor.

12. The circuit of claim 11, wherein the dissipating element comprises a load resistor and wherein the output terminal of the second transistor is coupled to the load resistor.

13. A power supply, comprising:

a rectifier component;

an output energy storage component that is configured to supply an output voltage to a load;

a first switch coupled between the rectifier component and the output energy storage component; and a power dissipating circuit including a detector configured to detect a state of the power supply and to generate a control signal responsive to the state of the power supply, a dissipating component, and a second switch configured to controllably couple the dissipating component to the output energy storage component in response to the control signal output by the detector.

14. A method of operating a power supply including an output energy storage component that is configured to supply an output voltage to a load, a rectifier that couples energy to the output energy storage component, and a dissipating component, the method comprising:

monitoring the power supply to determine if the power supply is active; and in response to determining that the power supply is inactive, coupling the dissipating component to the output energy storage component to dissipate energy from the output energy storage component;

wherein monitoring the power supply comprises detecting a signal of the power supply that is indicative of a state of the power supply; and wherein detecting the signal of the power supply comprises detecting a control signal applied to a switch in the power supply that controls a transfer of energy from the rectifier to the output energy storage component.

* * * * *

UNITED STATES PATENT AND TRADEMARK OFFICE
CERTIFICATE OF CORRECTION

| | |
|---|---|
| PATENT NO. | : 8,537,569 B2 |
| APPLICATION NO. | : 12/824842 |
| DATED | : September 17, 2013 |
| INVENTOR(S) | : Myers et al. |

It is certified that error appears in the above-identified patent and that said Letters Patent is hereby corrected as shown below:

<u>On the Title Page:</u>
Item (75) Inventors: Please correct the last name of the second inventor so that
"Joseph Paul Chobol" reads -- Joseph Paul Chobot --

Signed and Sealed this
Eighth Day of March, 2016

Michelle K. Lee
*Director of the United States Patent and Trademark Office*